United States Patent [19]

Murata et al.

[11] Patent Number: 5,132,261

[45] Date of Patent: Jul. 21, 1992

[54] OLEFIN POLYMERIZATION CATALYST COMPONENT

[75] Inventors: Masahide Murata; Hiroyuki Furuhashi; Seizaburo Kanazawa; Teruo Yashiro; Masafumi Imai; Akira Nakano, all of Saitama, Japan

[73] Assignee: Tonen Corporation, Tokyo, Japan

[21] Appl. No.: 635,503

[22] PCT Filed: May 17, 1990

[86] PCT No.: PCT/JP90/00631

§ 371 Date: Jan. 7, 1991

§ 102(e) Date: Jan. 7, 1991

[87] PCT Pub. No.: WO90/14364

PCT Pub. Date: Nov. 29, 1990

[30] Foreign Application Priority Data

May 17, 1989 [JP] Japan .................... 1-121415

[51] Int. Cl.$^5$ ............................................ C08F 4/649
[52] U.S. Cl. ........................... 502/116; 502/108; 502/111; 502/115; 502/121; 502/122; 502/123; 502/124; 502/125; 502/126; 502/127; 526/128
[58] Field of Search ............. 502/108, 111, 115, 116, 502/121, 122, 123, 124, 125, 126, 127

[56] References Cited

U.S. PATENT DOCUMENTS

| | | | |
|---|---|---|---|
| 4,295,991 | 10/1981 | Wristers | 502/108 X |
| 4,814,311 | 3/1989 | Murata et al. | 502/125 X |
| 4,814,312 | 3/1989 | Murata et al. | 502/125 X |
| 4,814,313 | 3/1989 | Murata et al. | 502/125 X |
| 4,950,630 | 8/1990 | Murata et al. | 502/125 X |
| 4,960,743 | 10/1990 | Murata et al. | 502/111 X |

*Primary Examiner*—Patrick P. Garvin
*Attorney, Agent, or Firm*—Wenderoth, Lind & Ponack

[57] ABSTRACT

The present invention relates to a catalyst for the polymerization of olefins, and provides a catalyst component of magnesium support type which has a high catalytic activity as well as improved catalytic grain strength sufficient for practical use and which hardly deteriorates even after storage for a long time. The catalyst component is obtained by contacting (a) metallic magnesium with (b) a hydrocarbon represented by the general formula RX wherein R is a hydrocarbon group of 1 to 20 carbon atoms and X is a halogen atom, then contacting the resulting composition with (c) a compound represented by the general formula $X^1{}_nM(OR^1)_{m-n}$ wherein $X^1$ is a hydrogen atom, halogen atom or a hydrocarbon group of 1 to 20 carbon atoms, M is a boron, carbon, aluminum, silicon or phosphorus atom, $R^1$ is a hydrocarbon group of 1 to 20 carbon atoms, m is the atomic valence of M and $m > n \geq 0$, and (d) a titanium alkoxide represented by the general formula $Ti(OR^2)_4$ wherein $R^2$ is a hydrocarbon group of 1 to 12 carbon atoms, and then contacting the resulting solid with (e) an olefin in the presence of (f) an organoaluminum compound, then with (g) a halogen-containing alcohol and further with (h) an electron donating compound and (i) a titanium compound.

1 Claim, 1 Drawing Sheet

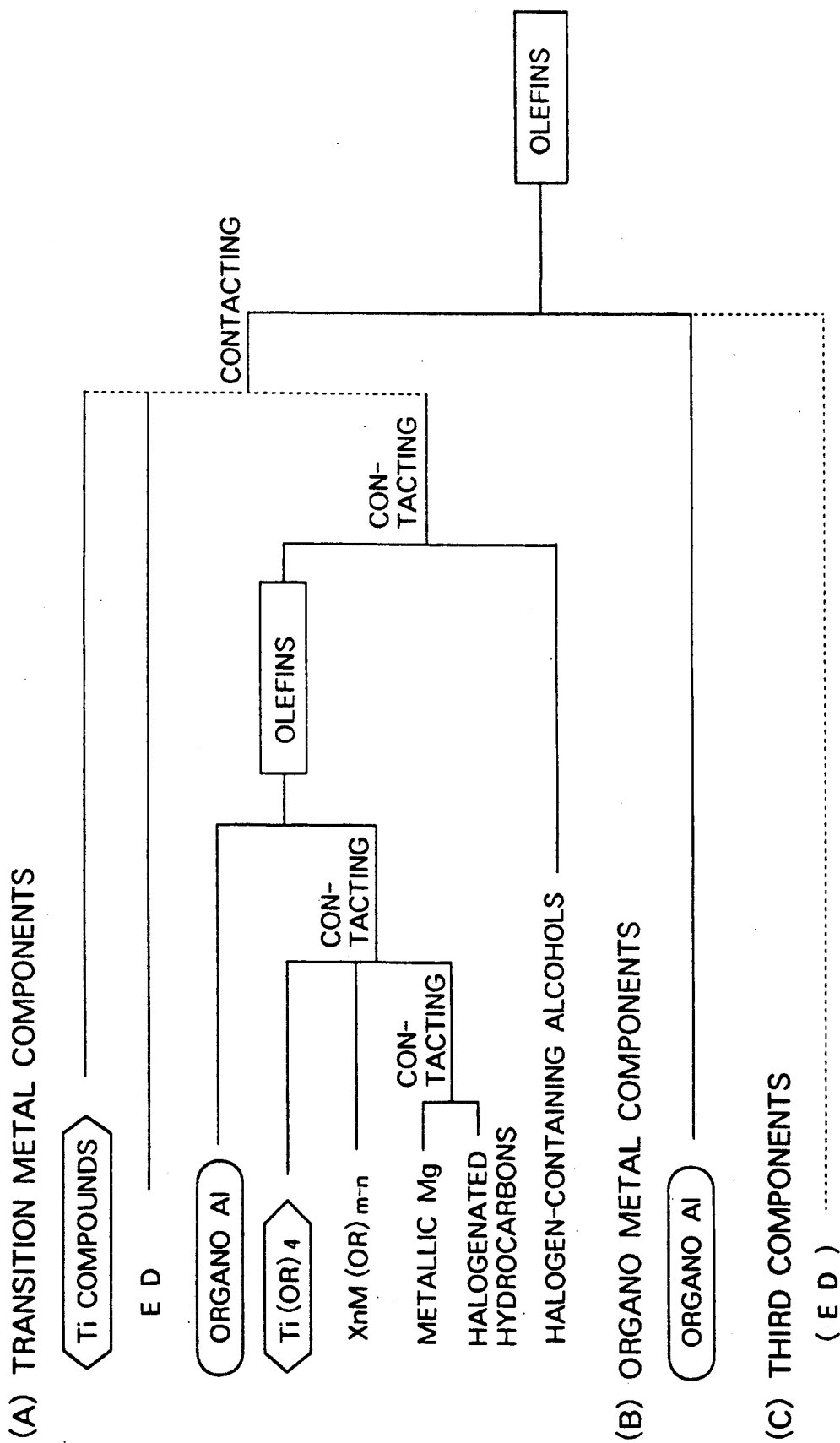

OLEFIN POLYMERIZATION CATALYST COMPONENT

TECHNICAL FIELD OF THE INVENTION

This invention relates to a catalyst for the polymerization of olefins.

TECHNICAL BACKGROUND

In the polymerization of olefins, it is important to prevent the resulting polymer from breakage, and to this end, a treatment for increasing the strength of catalyst grains themselves has generally been carried out by a suitable method, typical of which is a prepolymerization treatment of the catalyst component.

This treatment comprises polymerizing an olefin in a small amount in the presence of the catalyst component and an organoaluminum compound before subjecting the catalyst component to polymerization of the olefin, and thereby incorporating the resulting polymer into the catalyst component. However, when this prepolymerization treatment is carried out on the so-called catalyst of magnesium-support type, the activity of the catalyst is largely lowered after storage for a long period of time.

In order to suppress the deterioration of the catalyst, a method has been employed comprising washing the catalyst after being subjected to the prepolymerization treatment with a large amount of an organic solvent, but the effect thereof is not sufficient.

Of late, it has been proposed to subject, before supporting a titanium component on a magnesium-containing solid, the magnesium-containing solid to a prepolymerization treatment, thus preventing deterioration of the catalyst (Japanese Patent Laid-Open Publication Nos. 89508 to 89511/1988). However, the catalyst components described in these publications consist of combinations of particular compounds and cannot exhibit high catalytic activity.

The inventors have hitherto proposed a catalyst component for polymerization of olefins, which is obtained by contacting metallic magnesium, halogenated hydrocarbons and a compound represented by the general formula $X_n M(OR)_{m-n}$ to obtain a solid, contacting the resulting solid with a halogen-containing alcohol and then contacting with an electron-donating compound and titanium compound (Japanese Patent Laid-Open Publication No. 264607/1988). This catalyst component has a polymerization capacity sufficient for practical use and results in polymer powders excellent in grain property, but has a problem of deterioration during storage.

The inventors have found that it is effective to bring the above described catalyst component, during preparation thereof, into contact with titanium alkoxide, before contact with a halogen-containing alcohol, and then to contact with an olefin in the presence of an organoaluminum compound. The present invention is based on this finding.

SUMMARY OF THE INVENTION

That is, it is an object of the present invention to provide a catalyst component of magnesium support type which has a high catalytic activity as well as improved catalytic grain strength sufficient for practical use, and which hardly deteriorates even after storage for a long time.

The above described object can effectively be accomplished by a catalyst component, obtained by contacting (a) metallic magnesium with (b) a halogenated hydrocarbon represented by the general formula RX wherein R is a hydrocarbon group of 1 to 20 carbon atoms and X is a halogen atom, then contacting the resulting composition with (c) a compound represented by the general formula $X^1_n M(OR^1)_{m-n}$ wherein $X^1$ is a hydrogen atom, a halogen atom or a hydrocarbon group of 1 to 20 carbon atoms, M is a boron, carbon, aluminum, silicon or phosphorus atom, $R^1$ is a hydrocarbon group of 1 to 20 carbon atoms, m is the atomic valence of M and $m > n \geq 0$, and (d) a titanium alkoxide represented by the general formula $Ti(OR^2)_4$ wherein $R^2$ is a hydrocarbon group of 1 to 12 carbon atoms, and then contacting the resulting solid with (e) an olefin in the presence of (f) an organoaluminum compound, then with (g) a halogen-containing alcohol and further with (h) an electron donating compound and (i) a titanium compound.

BRIEF DESCRIPTION OF THE DRAWING

FIG. 1 is a flow chart showing the process of preparing the catalyst component of the present invention.

DESCRIPTION OF THE PREFERRED EMBODIMENTS

Raw materials for the preparation of a support according to the present invention are as follows:

(a) Metallic Manesium

Any metallic magnesium can be used, but in particular, powdered and chipped ones are suitable. Before use, these metallic magnesiums are preferably washed with an inert hydrocarbon such as saturated aliphatic, alicyclic or aromatic hydrocarbons of 6 to 8 carbon atoms and heated and dried in the presence of an inert gas such as nitrogen.

(b) Halogenated Hydrocarbons

In the halogenated hydrocarbons represented by the general formula RX, preferably RX is a chlorinated or brominated alkyl group, aryl group or cycloalkyl group of 1 to 8 carbon atoms. Examples of such a halogenated hydrocarbon are methyl, ethyl, isopropyl, n-butyl, n-octyl and cyclohexyl chlorides and bromides, chlorobenzene and o-chlorotoluene.

(c) Compound of General Formula $X^1_n M(OR^1)_{m-n}$

In this formula, M, $X^1$, $R^1$, m and n have the same meaning as described above. $X^1$ may be a halogen-substituted hydrocarbon group of 1 to 20 carbon atoms. When $X^1$ is a hydrocarbon group, $X^1$ and $R^1$ may be the same of different. Hereinafter, the compound of the above described general formula will be referred to merely as an alkoxy compound.

Examples of the hydrocarbon are alkyl groups such as methyl, ethyl, propyl, i-propyl, butyl, amyl, hexyl, octyl, 2-ethylhexyl, decyl, etc., cycloalkyl groups such as cyclopentyl, cyclohexyl, methylcyclohexyl, etc., alkenyl groups such as allyl, propenyl, butenyl, etc., aryl groups such as phenyl, tolyl, xylyl, etc. and aralkyl groups such as phenethyl, 3-phenylpropyl, etc. Above all, alkyl groups of 1 to 10 carbon atoms are preferable.

Examples of the alkoxy group are given in the following.

(1) Compound when M is carbon $C(OR^1)_4$ such $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$ and $C(OC_8H_{17})_4$; $X^1C(OR^1)_3$ such as $HC(OCH_3)$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$, $CH_3C(OCH_3)_3$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$, $CH_2BrC(OC_2H_5)_3$, $CH_2ClC(OC_2H_5)_3$, $CH_3CHBr(OC_2H_5)_3$, $CH_3ClC(OC_2H_5)_3$, $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$ and $BrC(OC_2H_5)_3$; $X^1{}_2C(OR^1)_2$ such as $CH_3CH(OCH_3)_2$, $CH_3CH(OC_2H_5)_2$, $CH_2(OCH_3)_2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$ and $C_6H_5CH(OC_2H_5)_2$.

(2) Compound when M is silicon $Si(OR^1)$ such as $Si(OCH_3)_4$, $Si(OC_2H_5)_4$, $Si(OC_4H_9)_4$, $Si(O-i-C_4H_9)_4$, $Si(OC_6H_{13})_4$, $Si(OC_8H_{17})_4$, $Si[OCH_2CH(C_2H_5)C_4H_9]_4$ and $Si(OC_6H_5)_4$; $RSi(OR^1)_3$ such as $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$, $ClSi(OC_3H_7)_3$, $ClSi(OC_6H_5)_3$, and $BrSi(OC_2H_5)_3$; $R_2Si(OR^1)_2$ such as $(CH_3)_2Si-(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3$-$SiH(OC_2H_5)_2$, $CH_3BrSi(OC_2H_5)_2$ and $CH_3ISiH(OC_2H_5)_2$; $R_3SiOR^1$ such as $(CH_3)_3SiOCH_3$, $(CH_3)_3SiOC_2H_5$, $(CH_3)_3SiOC_4H_9$, $(CH_3)_3$-$SiOC_6H_5$, $(C_2H_5)SiOC_2H_5$ and $(C_2H_5)_3SiOC_2H_5$.

(3) Compound when M is boron $B(OR^1)_3$ such as $B(OC_2H_5)_3$, $B(OC_4H_9)_3$, $B(OC_6H_{13})_3$ and $B(OC_6H_5)_3$.

(4) Compound when M is aluminum $Al(OR^1)_3$ such as $Al(OCH_3)_3$, $Al(OC_2H_5)_3$, $Al(OC_3H_7)_3$, $Al(Oi-C_3H_7)_3$, $Al(OC_4H_9)_3$, $Al(Ot-C_4H_9)_3$, $Al(OC_6H_{13})_3$ and $Al(OC_6H_5)_3$.

(5) Compound when M is phosphorus $P(OR^1)_3$ such $P(OCH_3)_3$, $P(OC_2H_5)_3$, $P(OC_4H_9)_3$, $P(OC_6H_{13})_3$ and $P(OC_6H_5)_3$.

(d) Titanium Alkoxide

In the compound represented by the foregoing general formula, preferably $R^2$ is an alkyl group, aryl group or cycloalkyl group containing 1 to 8 carbon atoms. Examples of $R^2$ are alkyl groups such as methyl, ethyl, i-propyl, n-propyl, i-butyl, n-butyl, t-butyl, n-hexyl, n-octyl, etc., aryl groups such as phenyl, tolyl, etc. and cycloalkyl groups such as cyclohexyl, etc.

(e) Organoaluminum Compound

As the organoaluminum compound, there are used those represented by the general formula $R_nAlX_{3-n}$ wherein R is an alkyl or aryl group, X is a halogen atom, alkoxy group or hydrogen atom and n is any numeral in the range of $1 \leq n \leq 3$, for example, alkylaluminum compounds containing 1 to 18 carbon atoms, preferably 2 to 6 carbon atoms, such as trialkylaluminum, dialkylaluminum monohalide, monoalkylaluminum dihalide, alkylaluminum sesquihalide and dialkylaluminum monoalkoxide, mixtures or complex compounds thereof. Specifically, there are trialkylaluminums such as trimethylaluminum, triethylaluminum, tripropylaluminum, triisobutylaluminum, trihexylaluminum, etc., dialkylaluminum monohalides such as dimethylaluminum chloride, diethylaluminum chloride, diethylaluminum bromide, diethylaluminum iodide, diisobutylaluminum chloride, etc., monoalkylaluminum dihalides such as methylaluminum dichloride, ethylaluminum dichloride, methylaluminum dibromide, ethylaluminum dibromide, ethylaluminum diiodide, isobutylaluminum dichloride, etc., alkylaluminum sesquihalide such as ethylaluminum sesquichloride, etc., dialkylaluminum monoalkoxides such as dimethylaluminum methoxide, diethylaluminum ethoxide, diethylaluminum phenoxide, dipropylaluminum ethoxide, diisobutylaluminum ethoxide, diisobutylaluminum phenoxide, etc. and dialkylaluminum hydrides such as dimethylaluminum hydride, diethylaluminum hydride, dipropylaluminum hydride, diisobutylaluminum hydride, etc. Above all, diethylaluminum chloride and diisobutylaluminum chloride are preferable.

Furthermore, such an organic compound that two or more aluminums are bonded via an oxygen atom or nitrogen atom can be used, illustrative of which are $(C_2H_5)_2AlOAl(C_2H_5)_2$, $(C_4H_9)_2AlOAl(C_4H_9)_2$ and

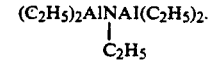

(f) Olefins

As an olefin, there are used monoolefins of 1 to 10 carbon atoms, for example, ethylene, propylene, 1-butene, 4-methyl-1-pentene and 1-hexene.

(g) Halogen-containing Alcohol

The halogen-containing alcohol used in the present invention means such a compound that in a mono- or polyhydric alcohol having one or more hydroxyl groups in one molecule, any one or more hydrogen atoms other than the hydroxyl groups are substituted by halogen atoms. As the halogen atom, there are chlorine, bromine, iodine and fluorine atoms, but chlorine atom is preferable.

Examples of these compounds are 2chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m, o, p)-chlorobenzyl alcohol, 4-chlorocatechol, 4-chloro-(m, o)-cresol, 6-chloro-(m, o)-cresol, 4-chloro-3,5-dimethylphenol, chlorohydroquinone, 2-benzyl-4-chlorophenol, 4-chloro-1-naphthol, (m, o, p)-chlorophenol, p-chloro-α-methyl benzyl alcohol, 2-chloro-4-phenylphenyl, 6-chlorothymol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m, o, p)-bromophenol, 4-bromoresorcin, (m, o, p)-chlorophenol, p-iodophenol, 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol, 2,2,2-trichloroethanol, 1,1,1-trichloro-2-propanol, $\beta,\beta,\beta$-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxytoluene, 2,3,5-tribromo-4-hydroxytoluene, 2,2,2-trifluoroethanol, $\alpha,\alpha,\alpha$-trifluoro-m-cresol, 2,4,6-triiodophenol, 2,3,4,6-tetrachlorophenol, tetrachlorohydroquinone, tetrachlorobisphenol A, tetrabromobisphenol A, 2,2,3,3-tetrafluoro-1-propanol, 2,3,5,6-tetrafluorophenol and tetrafluororesorcin.

(h) Electron Donating Compound

As the electron donating compound, there are given carboxylic acids, carboxylic anhydride, carboxylic acid esters, carboxylic acid halides, alcohols, ethers, ketones, amines, amides, nitriles, aldehydes, alcolates, phosphorus, arsenic and antimony compounds bonded with organic groups through carbon or oxygen, sulfonamides, thioethers, thioesters, carboxylic acid esters and the like.

Examples of the carboxylic acid are aliphatic monocarboxylic acids such as formic acid, acetic acid, propionic acid, butyric acid, isobutylic acid, valeric acid, caproic acid, pivalic acid, acrylic acid, methacrylic acid and the like; aliphatic dicarboxylic acids such as malonic acid, succinic acid, glutaric acid, adipic acid, sebacic acid, maleic acid, fumaric acid and the like; aliphatic oxycarboxylic acids such as tartaric acid; alicyclic carboxylic acids such as cyclohexanemonocarboxylic acid, cyclohexenemonocarboxylic acid, cis-1,2-cyclohexanedicarboxylic acid, cis-4-methylcyclohexene-1,2-dicarboxylic acid and the like; aromatic carboxylic acids such as benzoic acid, toluic acid, anisic acid, p-tert-butylbenzoic acid, naphthoic acid, cinnamic acid and the like; and aromatic polybasic carboxylic acids such as phthalic acid, isophthalic acid, terephthalic acid, naphthalic acid, trimellitic acid, hemimellitic acid, trimesic acid, pyromellitic acid, mellitic acid and the like.

As the carboxylic acid anhydride, there can be used the anhydrides of the above described carboxylic acids.

As the carboxylic acid ester, there can be used mono- or polyvalent esters of the above described carboxylic acids, illustrative of which are butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, ethyl hexanecarboxylate, methyl benzoate, ethyl benzoate, methyl p-toluiate, ethyl-p-ter-butylbenzoate, ethyl p-anisate, ethyl $\alpha$-naphthoate, isobutyl $\alpha$-naphthoate, ethyl cinnamate, monomethylphthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, dibutyl naphthalate, triethyl trimellitate, tributyl trimellitate, tetramethyl pyromellitate, tetraethyl pyromellitate, tetrabutyl pyromellitate and the like.

As the carboxylic acid halide, there can be used acid halides of the above described carboxylic acids, illustrative of which are acetyl chloride, acetyl bromide, acetyl iodide, propionyl chloride, butyryl chloride, butyryl bromide, butyryl iodide, pivalyl chloride, pivalyl bromide, acrylyl chlide, acrylyl bromide, acrylyl iodide, methacryloyl chloride, methacryloyl bromide, methacrylyl iodide, crotonyl chloride, malonyl chloride, malonyl bromide, succinyl chloride, succinyl bromide, glutaryl chloride, glutaryl bromide, adipyl chloride, adipyl bromide, sebacoyl chloride, sebacoyl bromide, maleoyl chloride, maleoyl bromide, fumaryl chloride, fumaryl bromide, tartaryl chloride, tartaryl bromide, cyclohexanecarboxylic chloride, cyclohexanecarboxylic bromide, 1-cyclohexenecarboxylic chloride, cis-4-methylcyclohexenecarboxylic chloride, cis-4-methylcyclohexenecarboxylic bromide, benzoyl chloride, benzoyl bromide, p-toluoyl chloride, p-toluoyl bromide, p-anisoyl chloride, p-anisoyl bromide, $\alpha$-naphthoyl chloride, cinnamoyl chloride, cinnamoyl bromide, phthaloyl dichloride, phthaloyl bromide, isophthaloyl dichloride, isophthaloyl dibromide, terephthaloyl dichloride, naphthaloyl dichloride and the like. Monoalkylhalides of dicarboxylic acids can also be used such as adipyl monomethylchloride, maleoyl monoethylchloride, phthaloyl butylchloride can also be used.

Alcohols are represented by the general formula ROH wherein R is an alkyl, alkenyl, cycloalkyl, aryl, or aralkyl group containing 1 to 12 carbon atoms. Examples of the alcohol are methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethylphenol, isopropylphenol, p-tert-butylphenol, n-octylphenol and the like.

Ethers are represented by the general formula $ROR^1$ wherein R and $R^1$ are alkyl, alkenyl, cycloalkyl, aryl and aralkyl groups containing 1 to 12 carbon atoms, R and $R^1$ being the same or different. Examples of the ethers are diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole, ethyl phenyl ether and the like. Any compound of the foregoing halogen-containing alcohols can also be used.

(i) Titanium Compound

The titanium compounds are 2-, 3- and 4-valent titanium compounds, illustrative of which are titanium tetrachloride, titanium tetrabromide, trichloroethoxytitanium, trichlorobutoxytitanium, dichlorodiethoxytitanium, dichlorodiethoxytitanium, dichlorodibutoxytitanium, dichlorodiphenoxytitanium, chlorotriethoxytitanium, chlorotributoxytitanium, tetrabutoxytitanium, titanium trichloride and the like. Above all, tetravalent titanium halides such as titanium tetrachloride, trichloroethoxytitanium, dichlorodibutoxytitanium, dichlorodiphenoxytitanium, etc. are preferable and titanium tetrachloride is most preferable.

Preparation of the catalyst component is carried out as follows:

The catalysts of the present invention can be prepared by contacting metallic magnesium with the halogenated hydrocarbon, then with the alkoxy compound and titanium alkoxide to obtain a solid, contacting the resulting solid with an olefin in the presence of an aluminum compound and then with a halogen-containing alcohol and further with the electron-donating compound and titanium compound.

(1) Contacting of Metallic Magnesium and Halogenated Hydrocarbon

Contacting them can be carried out in the presence of an inert hydrocarbon, for example, aliphatic, alicyclic or aromatic hydrocarbon containing 6 to 8 carbon atoms, but this is preferably carried out in the presence of an ether so as to effect the reaction more effectively. As the ether, there can be used diethyl ether, diisopropyl ether, dibutyl ether, diisobutyl ether, diisoamyl ether, di-2-ethyl-hexyl ether, diallyl ether, diphenyl ether, anisole and the like.

For the purpose of promoting the reaction, there can be used iodine, alkyl iodides, or inorganic halides such as calcium chloride, copper chloride, manganese chloride, hydrogen halides and the like.

The contacting reaction can be accomplished by stirring them at a contacting temperature of 0° to 250° C., preferably 30° to 120° C. and for a contacting time of 0.5 to 10 hours. The contacting of them is preferably carried out using the halogenated hydrocarbon in a proportion of 1 to 2 gram mole per 1 gram atom of the metallic magnesium.

(2) Contacting with Alkoxy Compound and Titanium Alkoxide

Contacting of the product obtained in the above described (1) with the alkoxy compound and titanium alkoxide can be accomplished by contacting first with the alkoxy compound and then with titanium alkoxide or contacting simultaneously with the alkoxy compound and titanium alkoxide.

The contacting of the product with the alkoxy compound and titanium alkoxide is preferably carried out in the presence of an inert hydrocarbon and/or ether as in the case of the foregoing (1). The contacting conditions can be similar to those of the foregoing (1). The amount of the alkoxy compound to be used is preferably such that OR' in the alkoxy compound is at least 1 per 1 atom of the metallic magnesium used in the foregoing (1), in particular, 3 to 5. In the case of the alkoxy compound represented by $X^1_2C(OR^1)_2$, for example, the alkoxy compound is preferably, in a proportion of at least 0.5 mole, in particular, 1.5 to 2.5 moles per 1 gram atom of the magnesium, and in the case of the alkoxy compound represented by $X^1C(OR^1)_3$, the alkoxy compound is preferably at least ⅓ mole, in particular, 1 to 5/3 moles. The titanium alkoxide is generally in a proportion of 0.01 to 0.5 mole, preferably, 0.02 to 0.1 mole per 1 mole of the alkoxy compound.

In this way, a solid (Solid I) is obtained, which can be washed with a suitable detergent, e.g. the foregoing inert hydrocarbon before the subsequent contacting with the olefin, and which can if necessary be dried.

(3) Contacting with Olefin

Contacting with the olefin is carried out in the presence of the foregoing organoaluminum compound. The contacting with the olefin (which will hereinafter be referred to as "prepolymerization") is preferably carried out in an inert hydrocarbon. Examples of the inert hydrocarbon are aliphatic, alicyclic and aromatic hydrocarbons such as propane, butane, pentane, hexane, heptane, octane, decane, kerosene, cyclohexane, benzene, toluene, xylene and the like.

When the prepolymerization is carried out in an inert hydrocarbon, Solid I is preferably in a proportion of 0.01 to 500 g, in particular, 0.1 to 50 g per 1000 ml of the hydrocarbon. The organoaluminum compound is generally in an aluminum/titanium (atomic ratio) of 0.01 to 500 and the prepolymerization is generally carried out at a temperature of at most 80° C., preferably −10° C. to +50° C. the prepolymerization is ordinarily carried out at normal pressure and if necessary, under pressure. Furthermore, the prepolymerization can be carried out in the presence of a molecular weight regulator such as hydrogen and in the presence of other olefins if the quantity thereof is 5 mole % or less.

The prepolymerization is carried out in the presence of the organoaluminum compound, during which an electron-donating compound can jointly be present. As the electron-donating compound, there can be used any compound of the foregoing electron-donating compounds used for the preparation of the catalyst component of the present invention. In addition, other electron-donating compounds comprising organosilicon compounds or those containing hetero atoms such as nitrogen, sulfur, oxygen, phosphorus, etc. can also be used.

Examples of the organosilicon compound are tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropoxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropoxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallylsilane, methylphenyldimethoxysilane, chlorophenyldiethoxysilane and the like.

Examples of the electron-donating compound containing hetero atoms are compounds containing nitrogen atoms, such as 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluic amide, benzonitrile, acetonitrile, aniline, p-toluidine, o-toluidine, m-toluidine, triethylamine, diethylamine, dibutylamine, tetramethylenediamine, tributylamine and the like, compounds containing sulfur atoms, such as thiophenol, thiophene, ethyl-2-thiophenecarboxylate, ethyl-3-thiophenecarboxylate, 2-methylthiophene, methylmercaptan, ethylmercaptan, isopropylmercaptan, butylmercaptan, diethyl thioether, diphenyl thioether, methyl benzenesulfonate, methyl sulfite, ethyl sulfite and the like, compounds containing oxygen atoms, such as tetrahydrofuran, 2-methyltetrahydrofuran, 3-methyltetrahydrofuran, 2-ethyltetrahydrofuran, dioxane, dimethyl ether, diethyl ether, dibutyl ether, dibutyl ether, diisoamyl ether, diphenyl ether, anisole, acetophenone, acetone, methyl ethyl ketone, acetylacetone, ethyl 2-furalate, isoamyl 2-furalate, methyl 2-furalate, propyl 2-furalate and the like and compounds containing phosphorus atoms, such as triphenylphosphine, tributylphosphine, triphenyl phosphite, tribenzyl phosphite, diethyl phosphate, diphenyl phosphate and the like.

When using the electron-donating compound together with the organoaluminum compound, these compounds are generally used in an aluminum (gram atom)/electron-donating compound (gram mole) ratio of 0.1 to 100, preferably 0.5 to 50.

In this way, a polyolefin is formed and taken in Solid I. The prepolymerization is preferably carried out in such a manner that the content of the polyolefin in Solid I is 0.05 to 100 g, preferably 0.1 to 50 g, more preferably 0.2 to 20 g per 1 g of Solid I.

The thus obtained polyolefin-containing solid is then contacted with the halogen-containing alcohol, but as occasion demands, it can be washed with a hydrocarbon such as hexane, heptane, octane, cyclohexane, benzene, toluene or xylene and if necessary, can be dried, before contacting with the alcohol.

(4) Contacting with Halogen-containing Alcohol

Contacting of the polyolefin-containing solid obtained in the foregoing (3) with the halogen-containing alcohol (Component A) can be carried out with agitation in the presence of an inert medium. As the inert medium, there can be used hydrocarbons such as pentane, hexane, heptane, octane, decane, cyclohexane, benzene, toluene, xylene and the like, and halogenated hydrocarbons such as 1,2-dichloroethane, 1,2-dichloropropane, carbon tetrachloride, butyl chloride, isoamyl chloride, bromobenzene, chlorobenzene and the like.

The contacting of them is generally carried out at $-20°$ C. to $+150°$ C. for 0.1 to 100 hours. When the contacting is exothermically carried out, they are gradually contacted at the beginning at a low temperature and after mixing of the whole amount is finished, the temperature is raised to continue the contacting.

Component A is used in a proportion of 0.05 to 20 gram mole, preferably 0.1 to 10 gram mole per 1 gram atom of magnesium in the solid. The solid product obtained by the contacting of the solid and Component A is subjected to the subsequent contacting, but as occasion demands, it can be washed with the above described inert medium before the contacting.

(5) Contacting with Electron-donating Compound and Titanium Compound

The contacting of the solid product, electron-donating compound (Component B) and titanium compound (Component C) can be carried by any of (a) a method comprising contacting the solid product with Component B and then with Component C, (b) a method comprising contacting the solid product with Component C and then with Component B, and (c) a method comprising contacting the solid product with Components B and C at the same time.

Each of the above described contactings can be accomplished by mixing and stirring in the presence or absence of an inert medium. As the inert medium, the above described inert medium can be used.

The contacting of the solid product with Component B and C is generally carried out at 0° to 200° C. 0.5 to 20 hours. The amount of Component B is generally 0.005 to 10 gram mole, preferably 0.01 to 1 gram mole per 1 gram atom of magnesium in the solid product and that of Component C is generally at least 0.1 gram mole, preferably 1 to 50 gram mole per 1 gram atom of magnesium in the solid product.

The contacting of the solid product with Component C can be carried out two times or more in the same manner as described above. The foregoing contact product can if necessary be washed with an inert medium and then mixed and contacted with Component C (and the medium).

The catalyst component of the present invention can be prepared as described above, but if necessary, it can be washed with a hydrocarbon such as hexane, heptane, octane, cyclohexane, benzene, toluene, xylene, etc. and if necessary, it can further be dried.

The catalyst component obtained in the present invention can be used as a catalyst for the homopolymerization of an olefin or copolymerization thereof with other olefins in combination with an organo compound of Group I to III metals of the Periodic Table.

As the organo metal compound, there can be used organo compounds of lithium, magnesium, calcium, zinc and aluminum. Above all, organo aluminum compounds are preferably used. As this organoaluminum compound, there can be used any of the foregoing compounds used in the preparation of the catalyst component of the present invention. In particular, trialkylaluminum compounds such as triethylaluminum and triisobutylaluminum are preferable.

In addition to the organoaluminum compounds, other organo metal compounds can be used, for example, diethylmagnesium, ethylmagnesium chloride, diethylzinc, LiAl $(C_2H_5)_4$, LiAl $(C_7G_{15})_4$ and the like.

Furthermore, the organo metal compounds can be used alone or in combination with electron donating compounds. As the electron donating compound, there can be used any of the electron-donating compounds comprising Components C used for the preparation of the foregoing catalyst component in (5) and organosilicon compounds or compounds containing hetero atoms, which can be used jointly with the organoaluminum compounds for the same purpose in the foregoing (3).

These electron-donating compounds can be used in combination of two or more and can be used when the organo metal compound is used in combination with the catalyst component or after being previously contacted with the organo metal compound.

The amount of the organic metal compound used for the catalyst component of the present invention is generally 1 to 2000 gram mole, preferably 20 to 500 gram mole per 1 gram atom of titanium in the catalyst component.

The ratio of the organo metal compound and electrondonating compound is generally 0.1 to 40 gram atom, preferably 1 to 25 gram atom of the organo metal compound, as aluminum, to 1 mole of the electron-donating compound.

The catalyst consisting of the catalyst component and organo metal compound (and electron-donating compound), obtained as described above, is useful as a catalyst for the homopolymerization of monoolefins of 2 to 10 carbon atoms or copolymerization thereof with other monoolefins or diolefins of 3 to 10 carbon atoms and in particular, for the homopolymerization of α-olefins, particularly, α-olefins having 3 to 6 carbon atoms, for example, propylene, 1-butene, 4-methyl-1-pentene, 1-hexene, etc. or for the random- and block-copolymerization of the above described α-olefins with each other and/or ethylene.

The polymerization reaction is carried out either in gaseous or liquid phase. In the case of the liquid phase, the polymerization is carried out in an inert hydrocarbon such as n-butane, i-butane, n-pentane, i-pentane, hexane, heptane, octane, cyclohexane, benzene, toluene, or xylene or in a liquid monomer. The polymerization temperature is generally −80° to +150° C., preferably 40° to 120° C. and the polymerization pressure can be, for example, 1 to 60 atm. Control of the molecular weight of the resulting polymer is carried out in the presence of hydrogen or other known molecular weight regulating agents. In the copolymerization of an olefin, the amount of other polyolefins to be copolymerized with the olefin is generally at most 30% by weight, in particular, 0.3 to 15% by weight. The polymerization reaction by the catalyst system of the present invention is carried out continuously or batchwise under the commonly used conditions. The copolymerization reaction can be carried out either in one or more stages.

EXAMPLES

The present invention will be illustrated specifically by the following examples and application examples, in which percents (%) are to be taken as those by weight unless otherwise indicated.

The heptane-insoluble content (hereinafter referred to as HI) showing the proportion of a crystalline polymer in the polymer is a residual amount obtained by extracting the product with boiled n-heptane by means of a Soxhlet extractor of improved type for 6 hours. The bulk density was measured according to ASTM-D 1895-69 Method A.

EXAMPLE 1

Contacting of Metallic Magnesium and n-Butyl Chloride 8.5 g (0.35 mole) of metallic magnesium (purity: 99.5%; average grain diameter: 1.6 mm) of chip-type and 200 ml of n-hexane were charged in a reactor of 1000 ml equipped with a reflux condenser under nitrogen atmosphere and stirred at 60° C. for 1 hour. The metallic magnesium was taken out of the reactor and then dried at 60° C. under reduced pressure to obtain previously activated metallic magnesium.

To the metallic magnesium was added 147 ml of di-n-butyl ether, to which a mixed solution of 40.1 ml of n-butyl chloride and 53.3 ml of di-n-butyl ether was dropwise added with agitation at 60° C., followed by further stirring at 70° C. for 1.5 hour.

Contacting with Ethyl Orthoformate and Tetraethoxytitanium

The reaction system was cooled to room temperature and a mixed solution of 55.4 ml (0.33 mole) of ethyl orthoformate [HC(OC$_2$H$_5$)$_3$] and 3.7 ml (0.018 mole) of tetraethoxytitanium was dropwise added with stirring thereto, followed by gradually raising the temperature to 80° C. and continuing the stirring for 2 hours at the same temperature. The resulting solid was washed with 300 ml of n-hexane at 60° C. 6 times and dried at room temperature for 1 hour under reduced pressure, thus obtaining 30.8 g of a solid (Solid A).

Prepolymerization 2.6 g of Solid A and 338 g of n-hexane were charged in a glass autoclave of 500 ml rinsed with nitrogen gas. The gas phase was removed at room temperature and then ethylene was introduced thereinto to saturate the n-hexane with ethylene gas. Then, 37.5 ml of an n-heptane solution of diethylaluminum chloride (1.0 mole/l as Al) was then added and ethylene was polymerized. The polymerization was continued until the amount of polyethylene formed reached 1.1 g and supply of ethylene was then stopped. The solid phase was washed with 400 ml of n-hexane five times at room temperature to prepare a slurry of the solid (Solid B) in n-hexane.

Contacting with 2,2,2-Trichloroethanol

The slurry of Solid B was subjected to decantation to remove the n-hexene and charged with 25.9 g of n-heptane in a flask of 200 ml, to which 5.6 ml of an n-heptane solution containing 1.5 ml of 2,2,2-trichloroethanol was added at room temperature, followed by stirring at room temperature for further 1 hour. Then, the product was washed with 100 ml of n-heptane 4 times and with 100 ml of toluene 2 times to obtain a solid component.

Contacting with Titanium Tetrachloride and Di-n-butyl Phthalate

To the above described solid component were added 40 ml of toluene and titanium tetrachloride so as to give a titanium chloride/toluene volume ratio of 3/2, the temperature being then raised to 80° C. While stirring, a mixed solution of 2 ml of di-n-butyl phthalate and 5 ml of toluene was dropwise added thereto and stirred at 80° C. for 2 hours. The resulting solid material was separated by filtration and washed with 100 ml of toluene 2 times at 75° C. Furthermore, titanium tetrachloride was added thereto so as to give a titanium tetrachloride/toluene volume ratio of 3/2 and stirred at 80° C. for 2 hours. The resulting solid material was separated by filtration at 80° C. and then washed with 100 ml of n-hexane at room temperature 7 times, thus obtaining 3.4 g of a catalyst component.

EXAMPLE 2

Example 1 was repeated except that the washing with n-hexane after the prepolymerization was not carried out, thus preparing a catalyst component.

COMPARATIVE EXAMPLE 1

Example 1 was repeated except that the tetraethoxysilane was not used and the prepolymerization was not carried out, thus obtaining a catalytic component. This catalytic component was subjected to prepolymerization in the similar manner to Example 1 to prepare a catalyst component.

EXAMPLE 3

Example 1 was repeated except using n-octyl chloride in place of the n-butyl chloride used as the halogenated hydrocarbon in Example 1, thus preparing a catalyst component.

EXAMPLE 4

Example 1 was repeated except using Si(OC$_2$H$_5$)$_4$ instead of the ethyl orthoformate used as the alkoxy compound in Example 1.

EXAMPLE 5

Example 1 was repeated except using tetra-n-butoxytitanium instead of the tetraethoxytitanium used as titanium alkoxide in Example 1, thus obtaining, a catalytic component.

EXAMPLE 6

Example 1 was repeated except using p-chlorophenol instead of 2,2,2-trichloroethanol used as the halogen-containing alcohol in Example 1, thus obtaining a catalyst component.

EXAMPLE 7

Example 1 was repeated except using p-cresol instead of the di-n-butyl phthalate used as the electron-donating compound in Example 1, thus obtaining a catalytic component.

COMPARATIVE EXAMPLE 2

Example 3 was repeated except preparing the catalyst component in the similar manner to Comparative Example 1 to prepare a catalyst component.

COMPARATIVE EXAMPLE 3

Example 4 was repeated except preparing the catalyst component in the similar manner to Comparative Example 1.

COMPARATIVE EXAMPLE 4

Example 5 was repeated except preparing the catalyst component in the similar manner to Comparative Example 1.

COMPARATIVE EXAMPLE 5

Example 6 was repeated except preparing the catalyst component in the similar manner to Comparative Example 1.

COMPARATIVE EXAMPLE 6

Example 7 was repeated except preparing the catalyst component in the similar manner to Comparative Example 1.

APPLICATION EXAMPLE 1

Polymerization of Propylene 10 mg of the catalyst component obtained in Example 1, 4 ml of a solution containing 0.1 mol of triethylaluminum in 1000 ml of n-heptane, and 2 ml of a solution containing 0.04 mole of phenyltriethoxysilane in 1000 ml of n-heptane were mixed, held for 5 minutes and charged in a stainless autoclave of 1500 ml, equipped with a stirrer, under nitrogen atmosphere. Then, 300 ml of hydrogen gas as a molecular weight regulator and 1000 ml of liquid propane were introduced into the reaction system under pressure and after raising the temperature of the reaction system to 70° C., polymerization of propylene was carried out for 1 hour. Consequently, polypropylene was obtained with a catalytic activity of 20,700 g/g catalyst component and the propylene had an HI of 96.8% and a bulk density of 0.39 g/cm$^2$.

The catalyst component obtained in Example 1 was charged in a glass vessel rinsed with nitrogen gas, sealed and stored at 40° C. for 30 days and 60 days and then subjected to polymerization of propylene. The polymerization of propylene was carried out in the same manner as described above to obtain results shown in Table 1, from which it is apparent that there is little deterioration after storage.

APPLICATION EXAMPLES 2 to 13

The procedure of Application Example 1 was repeated except using the catalyst components obtained in Examples 2 to 7 and Comparative Examples 1 to 6 instead of the catalyst component obtained in Example 1, thus obtaining results shown in Table 1:

TABLE 1

| Application Example | Catalyst Component | Storage Days (day) | Catalyst Activity (g · pp/ g · cat) | HI (%) | Bulk Density (g/cm$^2$) |
|---|---|---|---|---|---|
| 1 | Example 1 | — | 20,700 | 96.8 | 0.39 |
|  | " | 30 | 20,300 | 96.7 | 0.39 |
|  | " | 60 | 19,900 | 96.6 | 0.39 |
| 2 | Example 2 | — | 19,800 | 96.6 | 0.39 |
|  | " | 30 | 19,200 | 96.5 | 0.39 |
|  | " | 60 | 18,700 | 96.5 | 0.39 |
| 3 | Example 3 | — | 19,800 | 96.9 | 0.39 |
|  | " | 30 | 19,600 | 96.9 | 0.39 |
|  | " | 60 | 19,200 | 96.8 | 0.39 |
| 4 | Example 4 | — | 17,200 | 96.8 | 0.39 |
|  | " | 30 | 16,900 | 96.7 | 0.39 |
|  | " | 60 | 16,800 | 96.7 | 0.39 |
| 5 | Example 5 | — | 20,600 | 97.3 | 0.39 |
|  | " | 30 | 20,300 | 97.2 | 0.39 |
|  | " | 60 | 20,000 | 97.1 | 0.39 |
| 6 | Example 6 | — | 19,800 | 97.0 | 0.39 |
|  | " | 30 | 19,600 | 96.9 | 0.39 |
|  | " | 60 | 19,500 | 96.9 | 0.39 |
| 7 | Example 7 | — | 14,700 | 96.0 | 0.39 |
|  | " | 30 | 14,000 | 95.8 | 0.39 |
|  | " | 60 | 13,700 | 95.8 | 0.39 |
| 8 | Comparative Example 1 | — | 20,400 | 97.0 | 0.38 |
|  | Comparative Example 1 | 30 | 17,200 | 96.7 | 0.38 |
|  | Comparative Example 1 | 60 | 14,400 | 96.5 | 0.38 |
| 9 | Comparative Example 2 | — | 17,200 | 96.8 | 0.38 |
|  | Comparative Example 2 | 30 | 14,700 | 96.5 | 0.38 |
|  | Comparative Example 2 | 60 | 11,500 | 96.5 | 0.38 |
| 10 | Comparative Example 3 | — | 15,400 | 96.7 | 0.38 |
|  | Comparative Example 3 | 30 | 12,600 | 96.7 | 0.38 |
|  | Compartive Example 3 | 60 | 9,800 | 96.7 | 0.38 |
| 11 | Comparative Example 4 | — | 17,700 | 96.7 | 0.38 |
|  | Comparative Example 4 | 30 | 14,200 | 96.6 | 0.38 |
|  | Comparative Example 4 | 60 | 11,500 | 96.6 | 0.38 |
| 12 | Comparative Example 5 | — | 19,000 | 96.9 | 0.38 |
|  | Comparative Example 5 | 30 | 15,600 | 96.5 | 0.38 |
|  | Comparative Example 5 | 60 | 12,400 | 96.5 | 0.39 |
| 13 | Comparative Example 6 | — | 14,500 | 95.4 | 0.38 |
|  | Comparative Example 6 | 30 | 10,600 | 95.3 | 0.38 |
|  | Comparative Example 6 | 60 | 7,400 | 95.3 | 0.38 |

Utility and Possibility on Commercial Scale

The catalyst component of the present invention is useful as a catalyst for the production of polyolefins, in particular, isotactic polypropylene, random copolymers of ethylene and propylene and block copolymers of ethylene and propylene.

The polymerization catalyst using the catalyst component of the present invention has a high polymerization activity and stereoregularity and is capable of giving olefin polymer powders each having a high bulk density. Furthermore, in this catalyst component, the polymerization activity is hardly lowered even after storage for a long period of time.

We claim:

1. A catalyst component for polymerization of olefins, obtained by contacting
   (a) metallic magnesium with
   (b) a halogenated hydrocarbon represented by the general formula RX wherein R is a hydrocarbon group of 1 to 20 carbon atoms and X is a halogen atom, then contacting the resulting composition with
   (c) a compound represented by the general formula $X^1{}_nM(OR^1)_{m-n}$ wherein $X^1$ is a hydrogen atom, halogen atom or a hydrocarbon group of 1 to 20 carbon atoms, M is a boron, carbon, aluminum, silicon or phosphorus atom, $R^1$ is a hydrocarbon group of 1 to 20 carbon atoms, m is the atomic valence of M and $m > n \geq 0$, and
   (d) a titanium alkoxide represented by the general formula $Ti(OR^2)_4$ wherein $R^2$ is a hydrocarbon group of 1 to 12 carbon atoms, and then contacting the resulting solid with (e) an olefin in the presence of (f) an organoaluminum compound under prepolymerization conditions, then with (g) a halogen-containing alcohol and further with (h) an electron donating compound and (i) a titanium compound.

* * * * *